United States Patent [19]
Sakamoto

[11] Patent Number: 5,432,639
[45] Date of Patent: Jul. 11, 1995

[54] APPARATUS FOR DETECTING AN INITIAL POSITION OF A MOVABLE LENS IN A LENS BARREL OF A CAMERA

[75] Inventor: Satoshi Sakamoto, Tokyo, Japan

[73] Assignee: Sony Corporation, Japan

[21] Appl. No.: 135,183

[22] Filed: Oct. 12, 1993

Related U.S. Application Data

[63] Continuation of Ser. No. 781,594, Oct. 23, 1991, abandoned.

[30] Foreign Application Priority Data

Oct. 31, 1990 [JP] Japan .................. 2-294932

[51] Int. Cl.$^6$ ............... G02B 7/02; G02B 15/14
[52] U.S. Cl. ..................... 359/823; 359/694; 359/697
[58] Field of Search ............... 359/694–706, 359/819, 820, 822–826, 672, 557; 324/97, 259, 207.2, 207.14–207.20, 207.21, 207.24; 354/195.1–195.12, 400, 286; 310/12–14, 180–193; 250/201.3, 201.4; 318/135

[56] References Cited

U.S. PATENT DOCUMENTS

| | | | |
|---|---|---|---|
| 3,041,416 | 6/1962 | Kuhrt | 360/112 |
| 3,199,630 | 8/1965 | Engel et al. | 187/394 |
| 3,329,833 | 7/1967 | Dorsch | 307/309 |
| 3,344,347 | 9/1967 | Stevens | 324/521 |
| 3,473,109 | 10/1969 | Maaz et al. | 324/207.2 |
| 4,043,642 | 8/1977 | Hirose et al. | 359/697 |
| 4,086,519 | 4/1978 | Persson | 318/254 |
| 4,086,533 | 4/1978 | Ricouard et al. | 324/207.2 |
| 4,318,038 | 3/1982 | Munehiro | 318/135 |
| 4,325,614 | 4/1982 | Grimes | 354/437 |
| 4,361,805 | 11/1982 | Narimatsu et al. | 324/207.21 |
| 4,401,944 | 8/1983 | Narimatsu et al. | 324/207.21 |
| 4,403,515 | 9/1983 | Iwasaki | 324/207.24 |
| 4,740,064 | 4/1988 | Kono et al. | 359/697 |
| 4,750,821 | 6/1988 | Yamamoto et al. | 359/697 |
| 4,996,545 | 2/1991 | Enomoto et al. | 359/557 |

FOREIGN PATENT DOCUMENTS

| | | | |
|---|---|---|---|
| 114404 | 8/1984 | European Pat. Off. | 280/201.4 |
| 0475840 | 3/1992 | European Pat. Off. | |
| 4527191 | 9/1970 | Japan | |
| 213216 | 1/1990 | Japan | |
| 2098743 | 11/1982 | United Kingdom | |

OTHER PUBLICATIONS

Patent Abstracts of Japan, vol. 14, No. 25, of Jan. 18, 1990.
Patent Abstracts of Japan, vol. 6, No. 198, of Oct. 7, 1982.
Patent Abstracts of Japan, vol. 11, No. 110, of Apr. 7, 1987.

*Primary Examiner*—Loha Ben
*Assistant Examiner*—Thong Nguyen
*Attorney, Agent, or Firm*—Ronald P. Kananen

[57] ABSTRACT

An apparatus for detecting an initial position of a movable lens in a lens barrel in which a lens holder retaining the lens is reciprocally movable parallel to an optical axis of the lens. The apparatus includes a magnet arrangement which has north and south polarities and is secured to either the outer periphery of the lens holder or the inner periphery of the lens barrel. A magnet flux detecting device is secured to whichever of the outer periphery of the lens holder or the inner periphery of the lens barrel to which the magnet arrangement is not secured, and is arranged such that it faces a boundary between the polarities of the magnet arrangement. The detecting device detects magnetic flux density of the magnet arrangement and outputs a voltage based on the detected magnetic flux density. The initial position of the lens is determined when the output voltage indicates zero or approximately zero.

1 Claim, 7 Drawing Sheets

APPARATUS FOR DETECTING AN INITIAL POSITION OF A MOVABLE LENS IN A LENS BARREL OF A CAMERA

This application is a continuation of application Ser. No. 07/781,594 filed Oct. 23, 1991 now abandoned.

BACKGROUND OF THE INVENTION

1. Field of the Invention

This invention relates to an apparatus for detecting an initial position of a movable lens in a lens barrel of an inner focusing type for use in optical systems such as cameras.

2. Description of the Background

Conventionally, there have been proposed cameras, e.g., a video camera, which utilize a zoom lens barrel of an inner focusing type. In the inner focusing zoom lens barrel, lenses such as a master lens for focusing, a variator lens for zooming and the like are movable along an optical axis of the lens barrel. In the lens barrel, the relative position of the master lens is determined depending upon a position of the variator lens. Accordingly, it is essential to determine a reference position (origin) of the master lens to enable accurate positioning control. Namely, an initial position of the master lens must be determined as the reference position. For the purpose of fulfilling such requirement, there has been proposed an apparatus for detecting an initial position of the master lens, which includes a photo-interrupter used as a sensor means for detecting the initial position, as disclosed in Japanese Utility Model laid-open appln. No. 2-13216. FIGS. 12 to 14 are directed to the apparatus thus proposed. Referring to FIG. 12, an inner focusing lens barrel 1 has a cylindrical housing 2 which is provided, on front and rear portions thereof, with a focusing lens 3 and a charge coupled device (CCD) 7, respectively. Now, assuming the focusing lens 3 is the front of the lens barrel 1, mounted behind the focusing lens 3 are guide shafts 4a, 4a both of which extend axially parallel to the optical axis of the lens barrel, and in front of the CCD 7 are disposed guide shafts 4b, 4b which also extend parallel to the optical axis. On the guide shafts 4a, 4a is supported a lens holder 6 retaining a variator lens 5 for zooming. The lens holder 6 is reciprocally moved on the guide shafts 4a, 4a by manual operation along an optical axis C of the lens barrel 1. On the guide shafts 4b, 4b is supported a lens holder 9 retaining a master lens 8 for focusing. The lens holder 9 is reciprocally moved on the guide shafts 4b, 4b along the optical axis C by means of a motor M or the like.

The lens barrel housing 2 is also provided with an apparatus 50 for detecting an initial position of the master lens 8. As illustrated in FIG. 13, the apparatus 50 consists of an intercept plate 51 and a photo-interrupter 52 having a light-emitting element 53 and a photo-detecting element 54. The intercept plate 51 is secured to a lower portion of an outer periphery of the lens holder 9. The photo-interrupter 52 is secured at a rear portion of a lower inner-periphery of the housing 2 so as to face the plate 51 upon reciprocating movement of the lens holder 9. The elements 53 and 54 are disposed opposite each other in a direction perpendicular to the optical axis C. When the lens holder 9 moves reciprocally and the plate 51 fixed thereon moves to pass between the elements 53 and 54, the plate 51 intercepts light emitted from the element 53. In response to the interception off the emitted light, the photo-detecting element 54 generates an output signal so that an initial position off the master lens 8 is determined on the basis of a position off the lens holder 9.

Recently, since high miniatuarization off video cameras has been sought, it is necessary to effect highly accurate positioning of movable lenses in the lens barrel. If lens positioning error exceeds approximately 10 μm, incorrect focusing or the like occurs. However, the photo-interrupter 52 of the aforementioned apparatus 50 has an output voltage characteristic varying in response to change in environmental temperature, as shown in FIG. 14. This characteristic causes deterioration of lens positioning accuracy. Moreover, the photo-interrupter 52 is not suitable for miniature cameras due to its large size and further, due to its high manufacturing cost.

In order to overcome such disadvantages in the conventional detection apparatus 50 using a photo-interrupter, there has been proposed an apparatus using a Hall element. Referring to FIGS. 9 to 11, an apparatus 40 for detecting an initial position of a master lens 8 includes a rectangular magnet 41 and a Hall element 42. The magnet 41 consists of north- and south-polar magnet halves 41a and 41b which extend outwardly from a lower outer-periphery of the lens holder 9 and are attached together such that their mating faces extend in a longitudinal direction of the lens holder 9. The Hall element 42 is secured to a lower inner-periphery of the barrel housing 2 so as to face the north-polar magnet half 41a upon rearward movement of the lens holder 9. The hall element 42 detects magnetic flux generated from the magnet 41 and produces an output signal on the basis of an amount of the detected magnetic flux. On the basis of the produced output signal, an initial position of the lens holder 9, i.e., the master lens 8 mounting the magnet 41 is determined. The Hall element 42 has output voltage characteristic as shown in FIG. 10, in which vertical and longitudinal axes indicate the output voltage (V) and distance (D) between the magnet 41 and the Hall element 42, respectively. In FIG. 10, ½ Vo indicating half an amount of a peak voltage Vo is detected by a circuit (not shown) connected to the Hall element 42.

However, the output voltage characteristic of the Hall element 42 varies in response to change in environmental temperature, as shown in FIG. 11. Accordingly, an initial position of the lens 8, which is detected upon generation of the initially determined voltage ½ Vo, also varies from lo to lo' or lo" according to temperature change so that accuracy in positioning of the lens 8 is deteriorated and thereby focusing error is caused in the camera.

SUMMARY OF THE INVENTION

It is an object of the present invention to eliminate the aforementioned disadvantages and to provide an improved apparatus for detecting an initial position of a movable lens in a lens barrel of a camera.

In order to accomplish this object, there is provided an apparatus for detecting an initial position of a movable lens in a lens barrel in which a lens holder retaining the lens is reciprocally movable parallel with an optical axis of the lens. The apparatus includes magnet means which has north and south polarities and is alternatively secured to either an outer periphery of the lens holder or an inner periphery of the lens barrel. Magnet flux detecting means is also secured to whichever of the outer periphery of the lens holder of the inner periphery of the lens barrel, to which the magnet means is not secured, such that the detecting means faces a boundary between the magnet halves of the magnet means. The detecting means detects magnetic flux density off the magnet means and develops an output voltage based on the detected magnetic flux density. The initial position of the lens is determined as a point where the output voltage indicates zero or a value of approximately zero.

DETAILED DESCRIPTION OF THE PREFERRED EMBODIMENT

Figure 13:
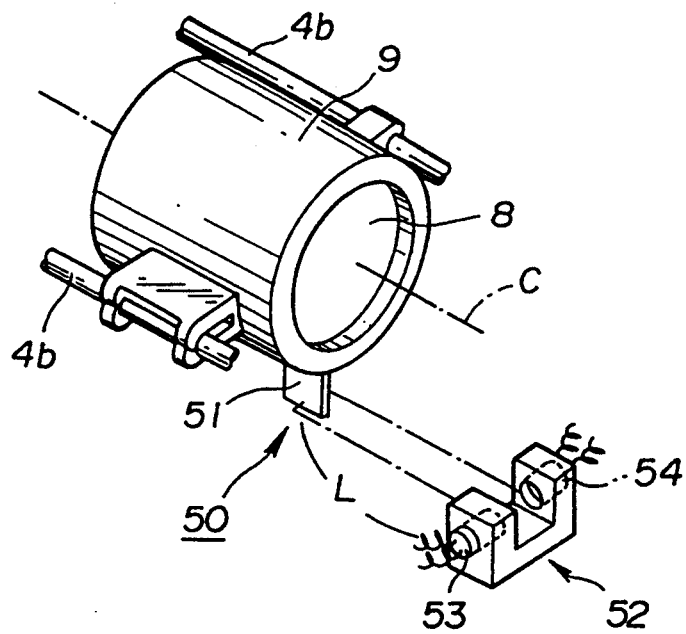
FIG. 13 is a perspective view of a conventional apparatus for detecting an initial position of a movable lens, in which a photo-interrupter is used.
Figure 14:
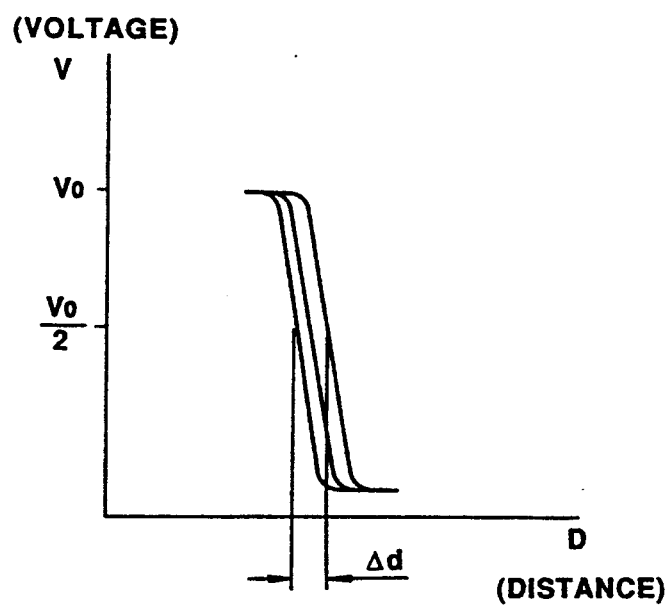
FIG. 14 is a diagram showing output voltage characteristics of the photo-interrupter, as varied according to change in environmental temperature.

The preferred embodiment of an apparatus for detecting an initial position of a movable lens in a lens barrel, according to the present invention will now be described with reference to the accompanying drawings. The explanations made hereinbefore with regard to FIGS. 12-14 in which the conventional lens barrel is described, are incorporated for reference into the detailed description of the preferred embodiment of the invention wherein the same reference numerals will represent like parts of the assembly of the invention.

Figure 1:
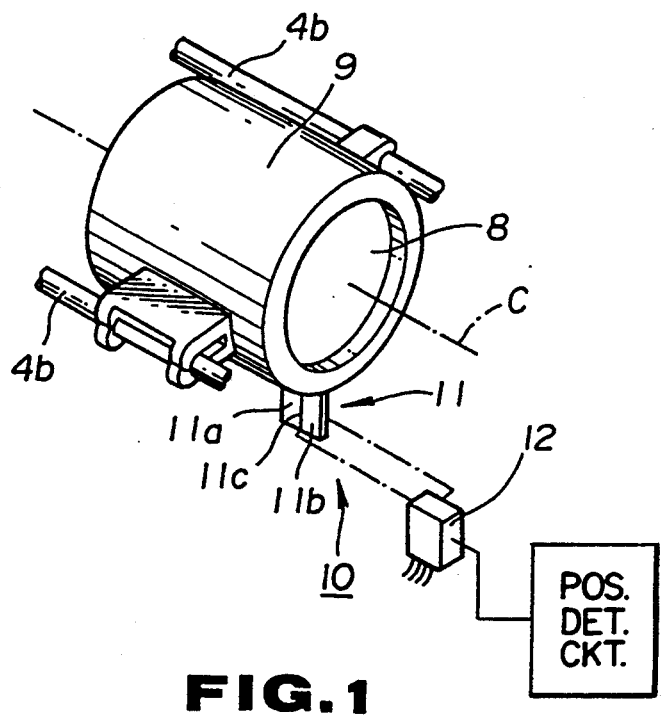
FIG. 1 is a perspective view of an apparatus for detecting an initial position of a movable lens, according to one embodiment of the present invention.
Figure 2:
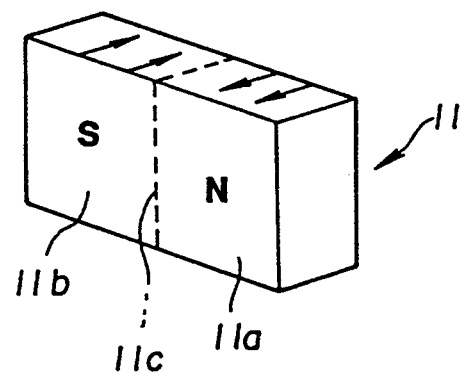
FIG. 2 is an enlarged perspective view of a first magnet configuration which may be used in the apparatus of FIG. 1.

Referring to FIG. 1, numeral 10 represents an apparatus for detecting an initial position of a movable lens 8 which is disposed in a housing 2 of a lens barrel 1. The lens 8 is a master lens retained in a cylindrical lens holder 9 which is supported by guide shafts 4b, 4b so as to be reciprocally movable parallel to an optical axis C of the lens 8. The apparatus 10 includes a rectangular magnet 11 and a Hall element 12. The magnet 11 consists of north- and south-polar magnet halves 11a and 11b which extend outwardly from a lower outer-periphery of the lens holder 9 and are attached together so as to be aligned in a longitudinal direction of the lens holder 9. The Hall element is secured to a lower inner-periphery of the housing 2 so as to face a boundary 11c between the north- and south-polar magnet halves 11a and 11b according to reciprocating movement of the lens holder 9. For instance, after the lens holder 9 is forced to the frontmost or rearmost position by manually, spring force or motor-drive, the magnet 11 on the lens holder 9 moves toward the Hall element 12. Then, the Hall element 12 detects magnetic flux generated from the magnet 11 and develops an output voltage on the basis of an amount of the detected magnetic flux.

Figure 3:
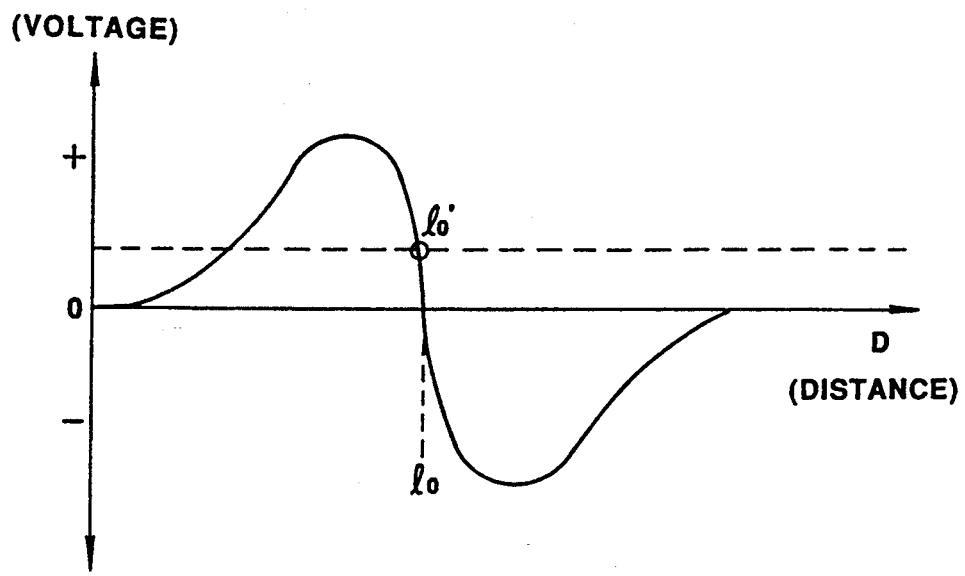
FIG. 3 is a diagram showing output voltage characteristics of a Hall element used in the apparatus of FIG. 1.

The output voltage characteristics of the Hall element 12 are shown in FIG. 3, in which vertical and horizontal axes respectively indicate the output voltage (V) and distance (D) between the magnet 11 and the Hall element 12. There are two peaks in the output voltage, one positive, one negative, in the vicinity of a point lo where an output voltage line traverses the horizontal axis. At an intersecting point lo, the Hall element 12 is just opposed to a boundary 11c between the magnet halves 11a and 11b. Accordingly, in a case where a position of the magnet 11 corresponding to the intersecting point lo of FIG. 3 is determined as an initial position of the magnet 11, various positions of the magnet 11 are determined relative to the initial position. Therefore, am initial position of the master lens 8 is determined as well as an initial position of the lens holder 9 mounting the magnet 11. Consequently, by using the initial position of the master lens 8 as a reference, various positions of the lens holder 9 may be determined with high accuracy.

Alternatively, the Hall element may be connected to a circuit which functions to vertically offset the level at which the output voltage indicates zero, for instance, in the manner shown in dotted line of FIG. 3. Due to this vertical offset of the horizontal axis D, a point lo' may be employed to indicate the initial position of the master lens 8 instead of the point lo.

Figure 4:
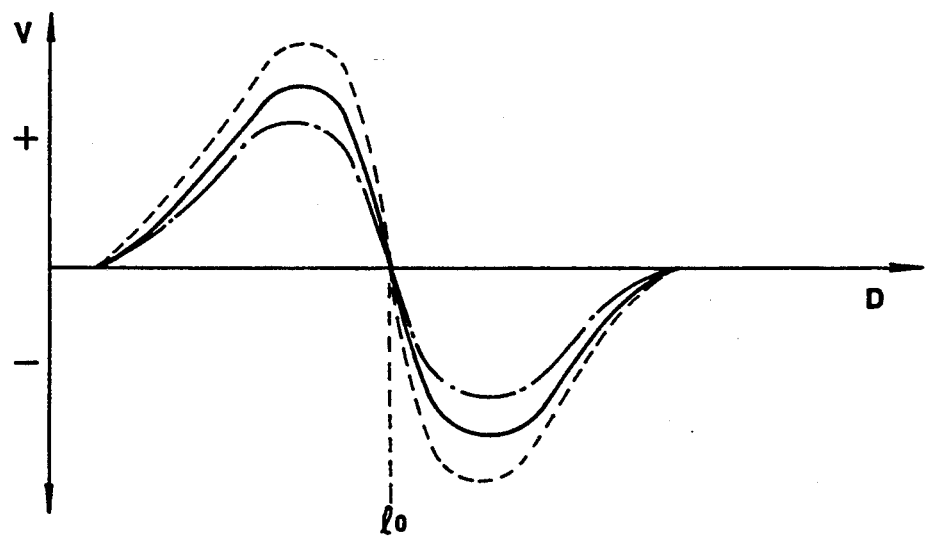
FIG. 4 is a diagram showing the output voltage characteristics of the Hall element varied according to change in environmental temperature.

Referring to FIG. 4, the Hall element 12 has output voltage characteristics varying in response to change in environmental temperature. In FIG. 4, as similar to FIG. 3, vertical and horizontal axes respectively indicate the output voltage (V) and distance (D) between the magnet 11 and the Hall element 12. Further, a position of the lens holder 9 corresponding to the intersecting point lo is determined as an initial position of the master lens 8. As shown in FIG. 4, separate output voltage lines traverse the horizontal axis at substantially the same point lo, while the peaks of the output voltage are different in level. Therefore, the initial position of the master lens 8 is stably determined without influence of change in environmental temperature.

Since the Hall element 12 has a smaller size and a lower manufacturing cost than a photo-interrupter as conventionally used, the apparatus 10 may be considerably improved in view of size, cost and consumption of electric power.

Figure 5:
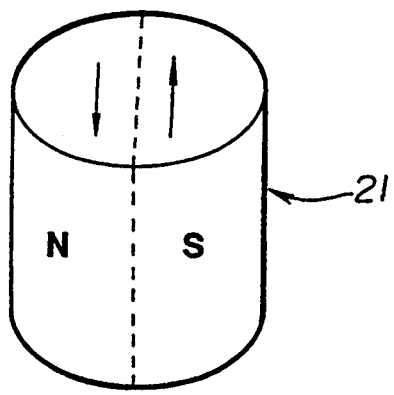
FIGS. 5 to 7 are enlarged perspective views of magnets which can be used in the apparatus of FIG. 1 in place of the configuration shown in FIG. 2.
Figure 6:
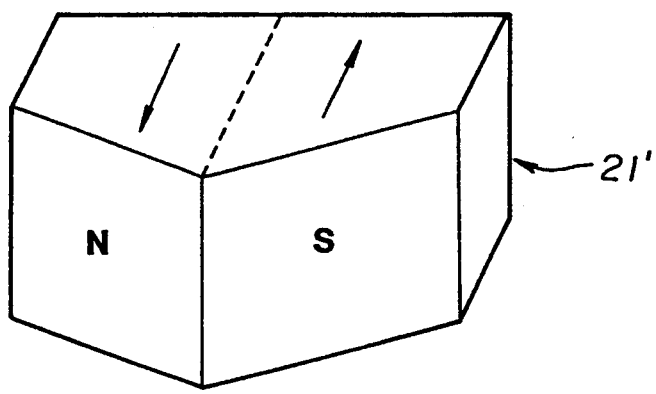
Figure 7:
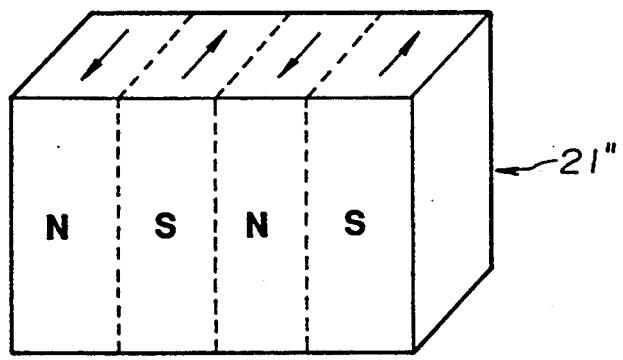

Further to say, the magnet 11 utilized in the apparatus of the invention may be of cylindrical shape 21 or trapezoidal shape 21' as illustrated in FIGS. 5 and 6. Further, as illustrated in FIG. 7, a rectangular magnet 21" may be formed by alternately arranging magnet pieces having north- and south polarities and attaching them together.

Figure 8:
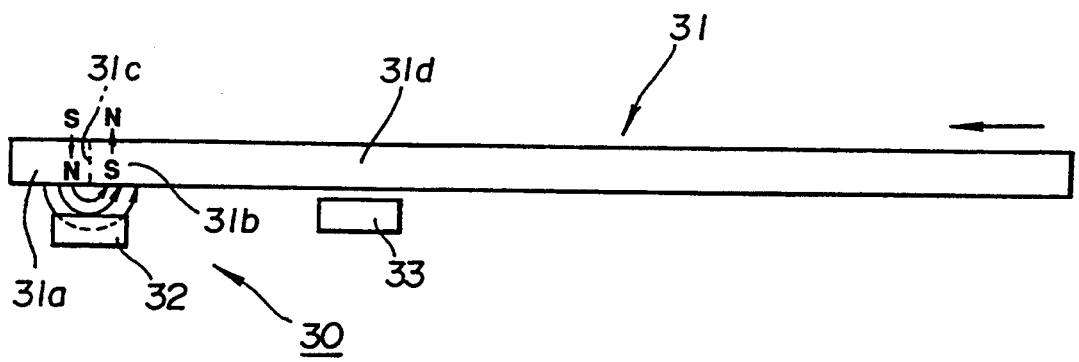
FIG. 8 is a schematic plan view of an apparatus for detecting an initial position of a movable lens, according to another embodiment of the present invention.
Figure 9:
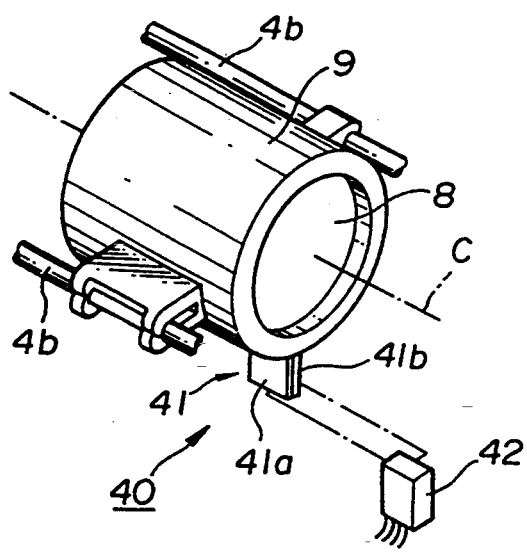
FIG. 9 is a perspective view of a conventional apparatus for detecting an initial position of a movable lens, in which a Hall element is used.
Figure 10:
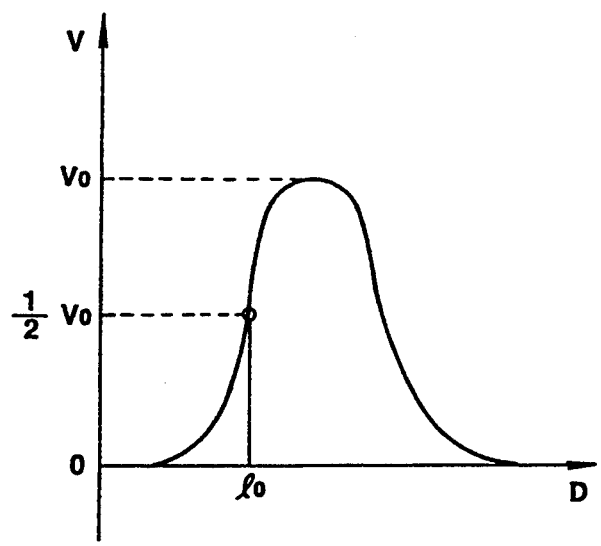
FIG. 10 is a diagram showing output voltage characteristics of the Hall element of FIG. 9.
Figure 11:
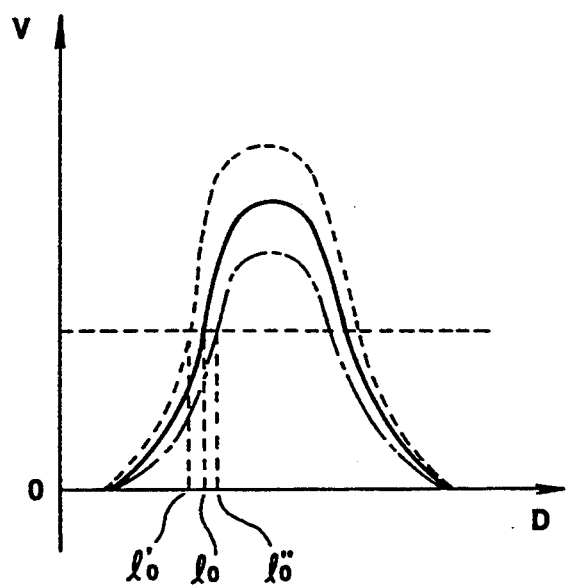
FIG. 11 is a diagram showing output voltage characteristics of the Hall element of FIG. 9, as varied according to change in environmental temperature.
Figure 12:
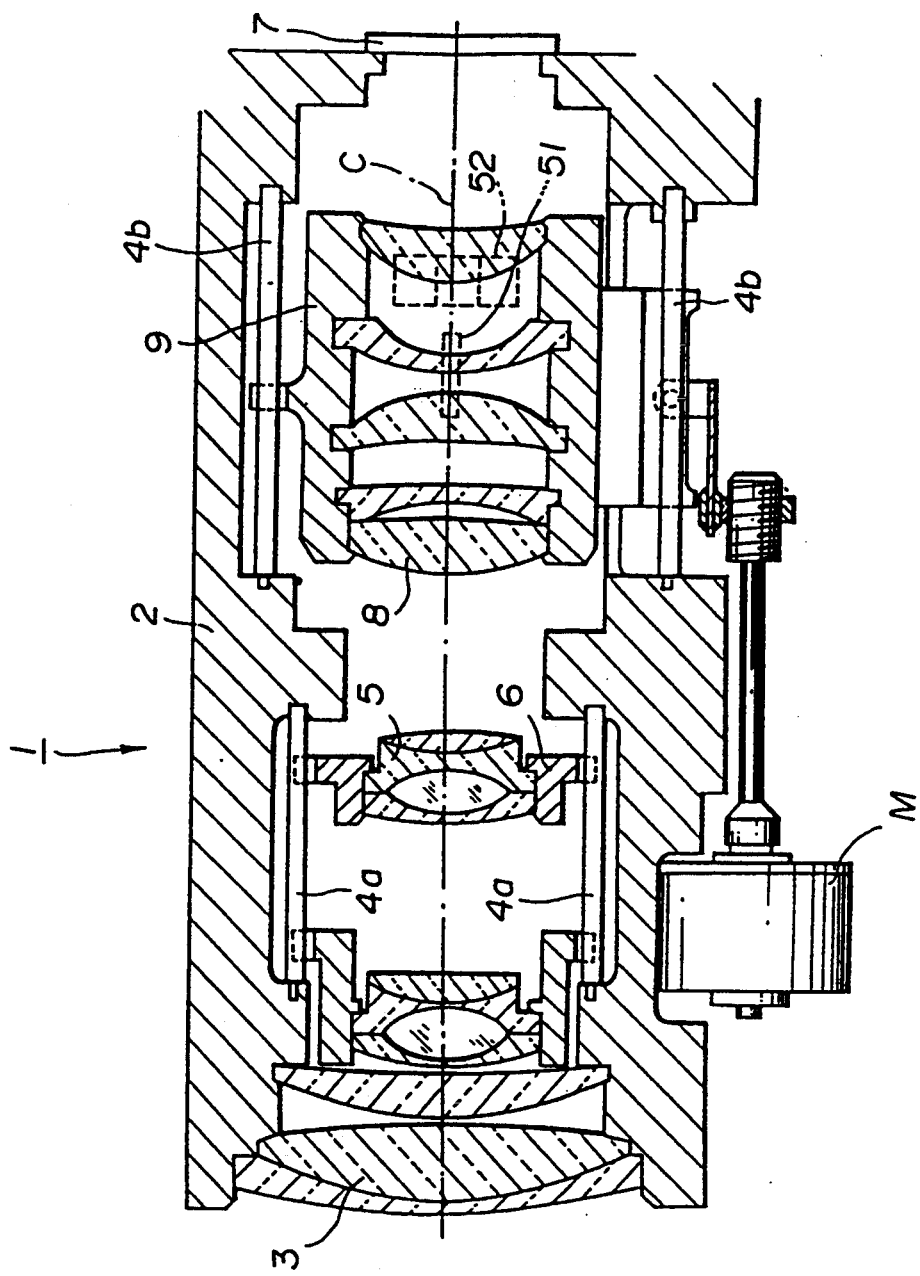
FIG. 12 is a sectional view of a conventional lens barrel.

Another preferred embodiment of an apparatus for detecting an initial position of a movable lens in a lens barrel will be described hereinafter with reference to FIG. 8. Referring to FIGS. 8 and 12, the apparatus 30 includes a rectangular bar-like magnet member 31 and a Hall element 32. The bar-like magnet member 31 is secured to a lower outer-periphery of the lens holder 9 while the Hall element 32 is mounted on a lower inner-periphery of the housing 2. In the proximity of the rear end portion, the bar-like magnet member 31 has at least a pair of north- and south-polar end magnets 31a and 31b. When the end magnets 31a and 31b on the bar-like magnet member 31 passes over the Hall element 32 upon reciprocating movement of the lens holder 9, the Hall element 32 detects magnetic flux generated from the end magnets 31a and 31b and outputs a voltage depending upon change in the detected magnetic flux. At this time, a boundary 31c between the end magnets 31a and 31b is detected as a point where the output voltage from the Hall element 32 indicates zero or approximately zero. As similar to the first embodiment mentioned above, when the Hall element 32 detects the boundary 31c between the end magnets 31a and 31, the corresponding position of the lens holder 9 is determined as an initial position of the lens 8. Moreover, the bar-like magnet member 31 extends forwardly into the front portion of the housing 2 where a lens holder 6 is reciprocally located. The bar-like magnet member 31 is also provided, at least in a part opposing to the lens holder 6 located in the front portion of the housing 2, with a plurality of north- and south-polar magnet pieces which are alternately arranged and attached together to form an integral body of the magnet member 31. In addition, a known MR (magnetoresistive elements) sensor 33 is secured to a front portion of the lower inner-periphery of the housing 2, in which the lens holder 6 retaining a variator lens 5, for example, is reciprocated. When the magnet member 31 moves toward the MR sensor 33 upon reciprocating movement of the lens holder 9, the MR sensor 33 outputs signals which are produced due to magnetic flux generated from the magnet pieces of the magnet member 31. Accordingly, a position of the variator lens 5 is also determined by detecting addresses or the like corresponding to respective positions of the magnet pieces by means of the MR sensor 33.

As is obvious from the aforementioned description of the preferred embodiments according to the invention, the apparatus of the invention includes a magnetic flux detecting means and north- and south-polar magnets which are alternatively secured to a lens barrel or a lens holder such that the detecting means faces a boundary between north and south poles of the magnet means. In the apparatus, an initial position of a movable lens in a lens barrel is determined as a position of the lens where an amount of output voltage of the detecting means is approximately zero. As a result, the initial position is accurately determined without influence of change in temperature and/or change due to the lapse of time. In addition, the apparatus of the invention can be further miniaturized and manufacturing costs and power-consumption can be effectively reduced.

Although, in the apparatus according to the aforementioned embodiment of the present invention, a magnet means is secured to the lens holder movable within the lens barrel to which a magnetic flux detecting means is secured thereto, the opposite arrangement may alternatively be employed. Further, the detecting means of the invention is not limited to a Hall element. In addition, the apparatus of the invention may be applicable to a lens holder retaining a variator lens for zooming so that an initial position of the variator lens can be determined. The present invention has been described in terms of a video camera but it is noted that the disclosed invention may be further applied to a still camera or other electronic optical system.

What is claimed is:

1. A position detecting apparatus, comprising:

a lens housing;

a lens holder which is disposed in said lens housing and which is relatively movable with respect to said lens housing;

an elongate magnetic member, said magnetic member being aligned with a direction of movement of said lens holder and connected with said lens holder for movement therewith;

a plurality of magnets which each have a north pole and a south pole and which are aligned along said magnetic member so that the north and south poles are alternatively arranged adjacent to each other;

magnetic interface means defined between the north pole and the south pole of a predetermined one of said plurality of magnets;

a single Hall sensor supported stationarily on said housing for detecting said lens holder assuming a predetermined position within said housing, said Hall sensor being arranged to produce a voltage signal which assumes an approximately zero level when said magnetic interface means assumes a predetermined position opposite said Hall sensor and said lens holder has assumed said predetermined position within said housing; and a magnetoresistive sensor supported stationarily on said housing, said magnetorestrictive sensor being responsive to a magnetic flux produced by a second magnet of said plurality of magnets for determining a position of a lens when said elongate magnetic member moves relative to said magnetorestrictive sensor.

* * * * *